(12) United States Patent
Infosino

(10) Patent No.: US 6,314,124 B1
(45) Date of Patent: Nov. 6, 2001

(54) METHOD AND SYSTEM FOR REMOTE ANSWER OF A TELEPHONE CALL

(75) Inventor: William J. Infosino, Watchung, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/001,203

(22) Filed: Dec. 30, 1997

(51) Int. Cl.[7] .................................................. H04M 1/661
(52) U.S. Cl. .............................. 375/70; 375/211; 375/355
(58) Field of Search ............................. 379/67.1, 70, 72, 379/73, 202–206, 210, 211, 212; 375/354, 355

(56) References Cited

U.S. PATENT DOCUMENTS

| 5,384,854 | * | 1/1995 | Downs et al. | 379/203 |
| 5,627,875 | * | 5/1997 | Kapsales | 379/211 |
| 5,784,448 | * | 7/1998 | Yaker | 379/206 |
| 5,809,130 | * | 9/1998 | Ayala | 379/211 |
| 5,905,790 | * | 5/1999 | Shemula | 379/202 |

* cited by examiner

Primary Examiner—Paul Loomis

(57) ABSTRACT

A system and method for remotely answering a phone call involves receiving a call over a first communications link at the home or office of a subscriber. A call recipient at a remote location is alerted of the call. Next, the call recipient is coupled to a bridging element over a second communications link. The bridging element bridges the first communications link and the second communications link together so that remote call recipient is connected to the call. The bridging is done so that the remote call recipient is connected to the calling party seamlessly.

20 Claims, 1 Drawing Sheet

METHOD AND SYSTEM FOR REMOTE ANSWER OF A TELEPHONE CALL

TECHNICAL FIELD

This invention relates to a system and method which enable a subscriber to answer telephone calls and, more particularly, to a service scheme where a subscriber can answer a telephone call directed to a particular location, such as the subscriber's home, when the subscriber is at a location remote from the particular location.

BACKGROUND OF THE INVENTION

It is difficult to get in touch with individuals, when they are away from home or the office. When an individual is not home or in the office, a phone call made to the individual's home or office goes unanswered or is answered by an answering machine. Thus, direct contact is not made with the individual.

Several methods have been developed to allow a subscriber remote from home to receive a telephone call made to the subscriber's home number. Available methods are call forwarding, remote call forwarding and personal reach service.

Call forwarding requires the subscriber to identify a number at which he can be reached so that calls to the subscriber's number can be forwarded to the identified number. That is, the subscriber must remember to inform the telephone network where he is going. Thus, each time a subscriber leaves his home, he must inform the network of a call forwarding number. If the subscriber moves from one remote number associated with a location to another location, he cannot be reached without first returning home and informing the network. Accordingly, the subscriber is often unreachable.

Remote call forwarding differs from call forwarding in that the subscriber informs the telephone network where she is located after arriving at a new location. Consequently, the ability to reach the subscriber is improved over regular call forwarding. With remote call forwarding, to remain reachable, the subscriber must update the call forwarding telephone number associated with each location every time she moves from one remote location to another. Thus, the subscriber not only may have to update her location frequently, but also must remember to update her location.

A personal reach service provides a subscriber with a special personal reach telephone number different from the subscriber's home telephone number. To contact a person using a personal reach service, the calling party must know and use the subscriber's personal reach number. Thus, an individual using the personal reach service has two phone numbers, a personal reach number and a home number, requiring a calling party to have access to the reach number and remember both the home and reach numbers.

There are several problems associated with each of the above-mentioned alternatives to contacting a subscriber who is away from home or the office. In each of the existing methods, the memory of a party contributes to whether a subscriber can be contacted. For example, with the personal reach service, the calling party must remember two numbers to contact a subscriber. Also, with remote and regular call forwarding schemes, the subscriber needs to remember to update his location. Also, none of the above existing systems allow the calling party to talk to a party at the home or office, a remote party or both. Each only allows the calling party to reach the remote subscriber.

Thus, there is a need in the art for a scheme which permits a calling party to call a subscriber's home or office and seamlessly reach the subscriber regardless of whether the subscriber is home or in the office without requiring the subscriber to inform the telephone network of a forwarding number or a remote location.

SUMMARY OF THE INVENTION

The present invention overcomes the shortcomings of the prior art by providing a scheme which allows a subscriber to answer his home (or office) phone remotely and transparently without requiring the subscriber to inform the network of his location. Specifically, the present invention provides a service that simultaneously pages a subscriber when the subscriber's home telephone number rings. A special two-line answering machine with bridging capabilities answers the calling party's call. In response to the page, the subscriber dials the telephone number of the second line connected to the answering machine and the answering machine bridges the calls together connecting the calling party to the subscriber.

One of the objects of the present invention is to provide a service which enables subscribers to answer their home (or office) telephone when away from home in an easy and natural way for both the caller and the subscriber.

The present invention provides a service which is superior to ordinary paging in several ways. The service does not require the subscriber to provide an additional telephone number in order to be reached. Further, a subscriber can answer all calls to his home (or office) rather than returning the calls of the people who know the subscriber's pager number. Also, the connection between the subscriber and calling party is transparent such that it appears to the calling party that the subscriber is at the location of the number originally called, e.g., at home, in the office.

Another benefit of the present invention is that a remote subscriber has the same functionality as if he or she were using an extension phone at the home or office of the subscriber. Consequently, an incoming call can be answered by someone in the home or office, the remote subscriber, or both individuals.

BRIEF DESCRIPTION OF THE DRAWINGS

The present invention will now be described in more detail with reference to preferred embodiments of the invention, given only by way of example, and illustrated in the accompanying drawing in which.

DETAILED DESCRIPTION

Figure 1:
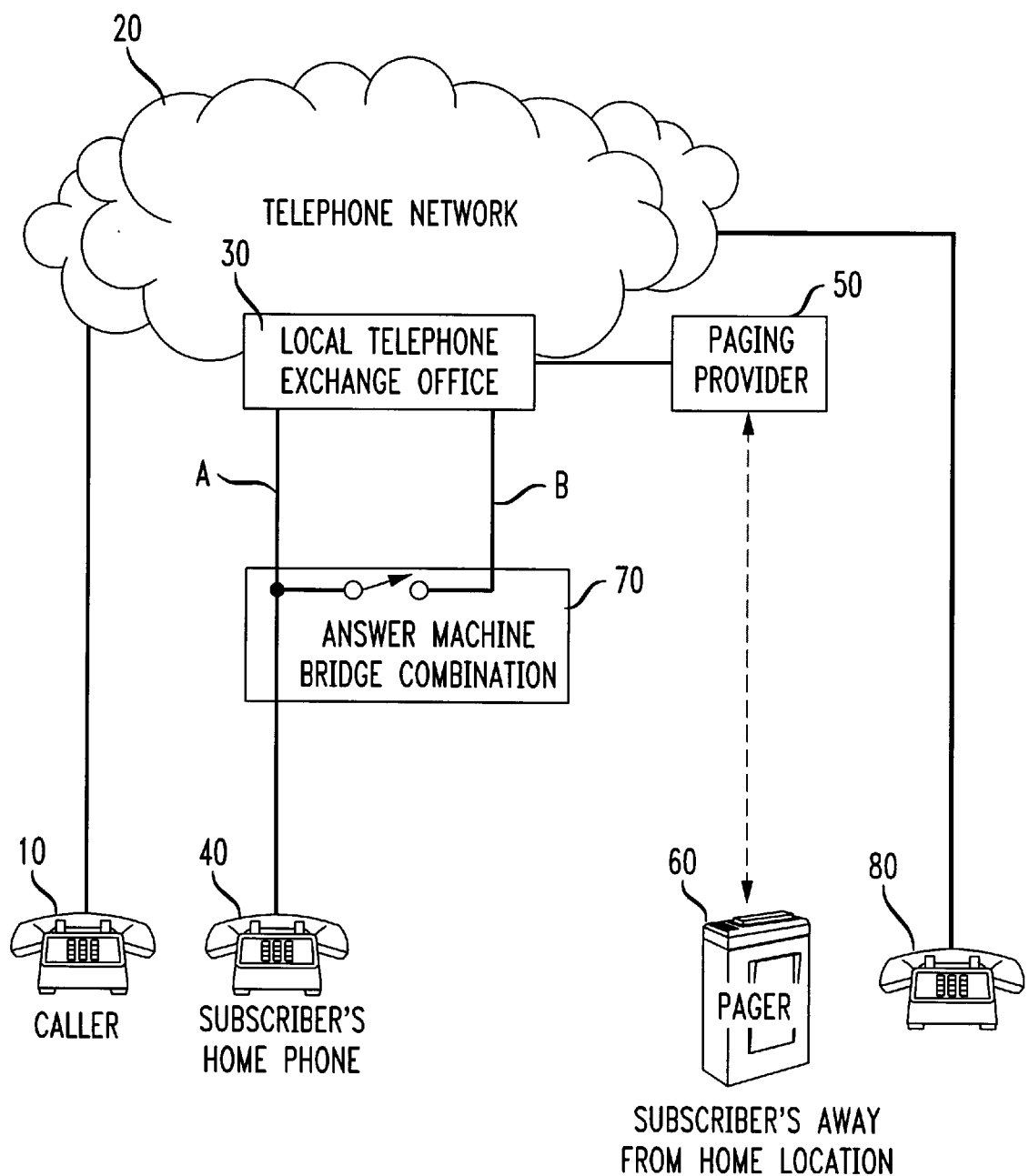
FIG. 1 is a communications network according an illustrative embodiment of the present invention.

An illustrative methodology for implementing a service providing remote answering of a telephone call will be described according to the present invention. While the service described below relates to a telephone system, it is to be understood that the present invention can be applied to all types of communications systems including, but not limited to, wired and wireless systems, satellite systems, micro cellular systems, personal communications services, and other known communication systems including any combination of the above. Also, various types of personal communication units can be implemented in these systems including, but not restricted to, a cordless phone, a cellular phone, a portable television, a wireless audio video phone, a pager, and any combination thereof. In the context of the description, the elements described below may be wired or wirelessly coupled together.

An illustrative implementation of a service which allows a subscriber to answer a home phone remotely will be described with reference to FIG. 1. It should be understood that the embodiment described relates to answering any designated phone line remotely, including, but not limited to, a home phone, an office phone or car phone. For purposes of this invention, the term "home" from hereon encompasses any fixed phone line and/or location designated by the subscriber.

A caller 10 dials a subscriber's home phone number in an effort to contact the subscriber. The call may be routed through a telephone network 20, such as the public switching telephone network, to a local telephone exchange office 30. The local telephone exchange office 30 routs the call to the subscriber's line, line A. Line A connects the call to the subscriber's home phone 40.

If line A is busy, a busy signal can be returned to the caller 10 back through the telephone network 30. Alternatively, if the subscriber has a roll line or call waiting line and that line is not busy, a call can still go through to the subscriber as known in the art. If the subscriber's roll line or call waiting line is also busy, then the caller 10 may receive a busy signal.

If line A is not busy, then the local telephone exchange office 30 initiates a ringing signal on line A and simultaneously notifies the remotely located subscriber, through, for example, a paging provider 50 or PCS (personal communications service). The paging provider 50 alerts the subscriber's pager 60 of the incoming call within a few seconds. When the subscriber's home phone 40 rings, it can be answered by an individual at the home of the subscriber, the away from home subscriber, an answering system forming part of the answer machine bridge combination 70, or a combination thereof.

An away from home subscriber can be alerted of an incoming call by, for example, the pager 60 receiving a paging signal. To answer the call, the away from home subscriber uses a telephone 80 to dial a telephone number of a second telephone line, line B, associated with the subscriber. Any type of telephone can be used as the telephone 80 to dial line B to answer a call, such as a mobile or land line phone. Also, a pager with telephone capabilities or similar multi-functional communications unit can be used such that the subscriber can have all necessary functionality in one device. Line B may be coupled to the telephone 80 through the local telephone exchange 30 and telephone network 20. Line A and line B are both coupled to the answer machine bridge combination 70, for example, in a manner similar to how a telephone line is connected to an ordinary answering machine.

If line B is not busy, the answer machine bridge combination 70 answers the subscriber's call on line B and couples line B to line A. Alternatively, rather than instantaneously coupling lines A and B, the answer machine bridge combination 70 can wait for the subscriber to input an access code. An access code may be input by a touch tone or speech recognition signal, for example. After verifying that the correct access code has been received, the answer machine bridge combination 70 can couple line A to line B.

If line A is still ringing when the bridge between line A and line B occurs, then the ringing ceases and the away from home subscriber answers the incoming call on line A. If a person at the subscriber's home later picks up the subscriber's home phone 40, then that person joins the conversation as if they answered a second phone at the subscriber's premises.

If the bridging of lines A and B occurs when the answer machine bridge combination 70 is delivering an outgoing message or recording an incoming message, then that action is interrupted and the away from home subscriber is connected to the caller 10 on line A. Thus, the answering machine may be disconnected or otherwise disabled from operating during the call.

If someone in the house has answered the incoming call on line A and is connected to the caller 10 when line A is coupled to line B then the away from home subscriber joins the ongoing call in a three-way conversation as if he or she had picked up another telephone unit at the subscriber's home. Once a remote subscriber or an individual at the subscriber's home answers the call, the other can join the ongoing call at any time. According to an alternative embodiment, intelligence can be placed into the answer machine bridge combination 70 such that the party answering the call could prevent another party from joining the call. For example, a timer could be used to prevent a party from joining the call in progress after a specified time has elapsed. Also, if either party to a call wants privacy on the call, they could issue a command (e.g., a touchtone signal) to block an attempt by another party to join the call.

If the subscriber's home phone line A has call waiting, and a second call comes in on line A, then the remote subscriber and the party at home, if both on a first call, can hear the call waiting signal. Either party can issue a command to place the first call on hold and connect to the second call. Once the command issues, both the remote subscriber and the party at home are connected to the second call. Similarly, either party can issue the command to return to the first call, and both parties are then connected to the first call.

The answer machine bridge combination 70 may be located at the subscriber's premises or in the telephone network 20. Functionality of many answering systems already resides in the telephone network, such as Call Answer or Audix. For large business subscribers, the functionality of the answer machine bridge combination 70 may reside in a public branch exchange (PBX) or be part of a Centrex service. With a PBX, the functionality can be provided by a switch installed on the customer's premises, while switching is carried out at the telephone company's central office with a Centrex service. Thus, the answer machine bridge combination 70 may be separately located with the answering system portion located as part of the telephone network 20 and the bridging element at the subscriber's premises or vice versa. Both elements remain coupled to line A according to this configuration. Further, when bridging of lines A and B occur, the answering system can be disabled as described above.

When the answer machine bridge combination 70 is located at the subscriber's premises, the subscriber may have two lines A and B coming into their premises and purchase a special answering machine with a built-in bridge 70. When a caller 10 calls the subscriber's home phone 40, the phone rings as usual and the subscriber's pager 60 is simultaneously alerted. The subscriber then remotely answers the call by dialing the telephone number of line B which is plugged into the special answering machine bridge combination 70. Then, the answer machine bridge 70 bridges line A and line B together connecting the caller 10 to the subscriber using the away from home telephone 80. Line B need not be restricted to this use. For example, line B could be plugged into a modem for use with a computer. Thus, when a subscriber would have no need to use the line for remote answering functions (e.g., when the subscriber is home), it can serve other purposes.

According to another embodiment of the present invention, the pager 60 may be adapted for use with a caller ID service. Thus, a remote subscriber can identify the calling party and decide whether to answer the incoming call. Such a pager may also be used as a portable caller ID box when the customer is at home. Other telephone services may also be implemented with the remote answer service.

For example, a service could be implemented which suppresses the alert signal to the pager if the call is from a number on a subscriber specified list. Analogously, a service which can be incorporated with the present invention involves the alert signal only being issued when a call is from a number on a subscriber specified list. Another service can suppress ringing in the home and only alert the pager if the call is from a number on a subscriber specified list. Yet another service intercepts the incoming call and asks the calling party which location to ring, the home, the remote location or both, or which party to ring (e.g., a business person A, business person B, a child, a mother, a father, etc.). In ringing a particular party, each individual can be assigned a particular remote ID which is active when that individual assigned paging device is powered on, or responsive to a location registration (e.g., remote or home) in which the party can inform the answer machine bridge combination 70. Another service alerts the pager with a unique beep pattern, sound or other indication when a call is from a number on a subscriber specified list.

There may be instances where the calling party or the remote call recipient is a computer or similar electronic device.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A method for remotely answering a phone call directed to a subscriber, comprising the steps of:
   receiving a first call over a first communications link at a subscriber's premises, the first call being coupled to the subscriber's premises through a bridging element;
   receiving a second call at the bridging element from the subscriber over a second communications link, the subscriber being at a location remote from the subscriber's premises; and
   bridging the first communications link and the second communications link together to link the subscriber's premises, the subscriber and a calling party.

2. The method according to claim 1, further comprising the step of alerting the subscriber of the first call.

3. The method according to claim 1, further comprising the step of answering the first call at the subscriber's premises prior to said step of bridging.

4. The method according to claim 3, wherein said step of bridging includes establishing three way communication among the subscriber at the remote location, a call recipient at the subscriber's premises and the calling party.

5. The method according to claim 3, wherein said step of answering includes answering the first call using an answering system.

6. The method according to claim 5, further comprising the step of disabling the answering system when said step of bridging occurs.

7. The method according to claim 5, wherein the answering system is located at the subscriber's premises.

8. The method according to claim 5, wherein the answering system is part of the bridging element.

9. The method according to claim 5, wherein the answering system is part of the first communications link and located remote from the subscriber's premises.

10. The method according to claim 1, further comprising the step of answering the first call at the subscriber's premises after said step of bridging.

11. The method according to claim 10, wherein said step of answering includes establishing three way communication among the subscriber at the remote location, a call recipient at the subscriber's premises, and the calling party.

12. The method according to claim 1, further comprising the steps of:
   receiving an access code associated with the second call; and
   verifying the access code prior to said step of bridging.

13. A system for remotely answering a phone call directed to a subscriber, comprising:
   a first communications unit at a subscriber's premises for receiving a first call over a first communications link; and
   a bridging element for receiving a second call over a second communications link, the second call initiated at a location remote from the subscriber's premises in response to an indication of the first call, said bridging element coupling the first communications link and the second communications link together to link the subscriber's premises, the subscriber and a calling part.

14. The system according to claim 13, wherein said bridging element includes an answering system for answering the first call a predetermined time after the first call is received by said first communications unit.

15. The system according to claim 14, wherein said bridging element disables said answering system if said answering system has answered the first call.

16. The system according to claim 13, further comprising a second communications unit for receiving the indication of the first call at a location remote from the subscriber's premises.

17. The system according to claim 16, wherein said second communications unit is a pager.

18. The system according to claim 13, wherein said bridging element establishes three way communication among the calling party, a call recipient at the subscriber's premises and the subscriber at the remote location.

19. The system according to claim 13, wherein said second communications unit initiates the second call.

20. The system according to claim 13, wherein said bridging element receives an access code associated with the second call and verifies that the access code is authorized prior to coupling the first communications link and the second communications link together.

* * * * *

UNITED STATES PATENT AND TRADEMARK OFFICE
CERTIFICATE OF CORRECTION

PATENT NO. : 6,314,124 B1　　　　　　　　　　　　　　　　　　Page 1 of 1
DATED : November 6, 2001
INVENTOR(S) : William J. Infosino It is certified that error appears in the above-identified patent and that said Letters Patent is hereby corrected as shown below:

<u>Column 6, claim 13,</u>
Line 36, delete "part" and insert therefor -- party --.

Signed and Sealed this

Nineteenth Day of March, 2002

Attest:

JAMES E. ROGAN
*Attesting Officer*　　　*Director of the United States Patent and Trademark Office*